July 7, 1936.  G. REGNAC-PAILLE  2,046,482
TROLLEY AND THE LIKE
Filed Jan. 11, 1935
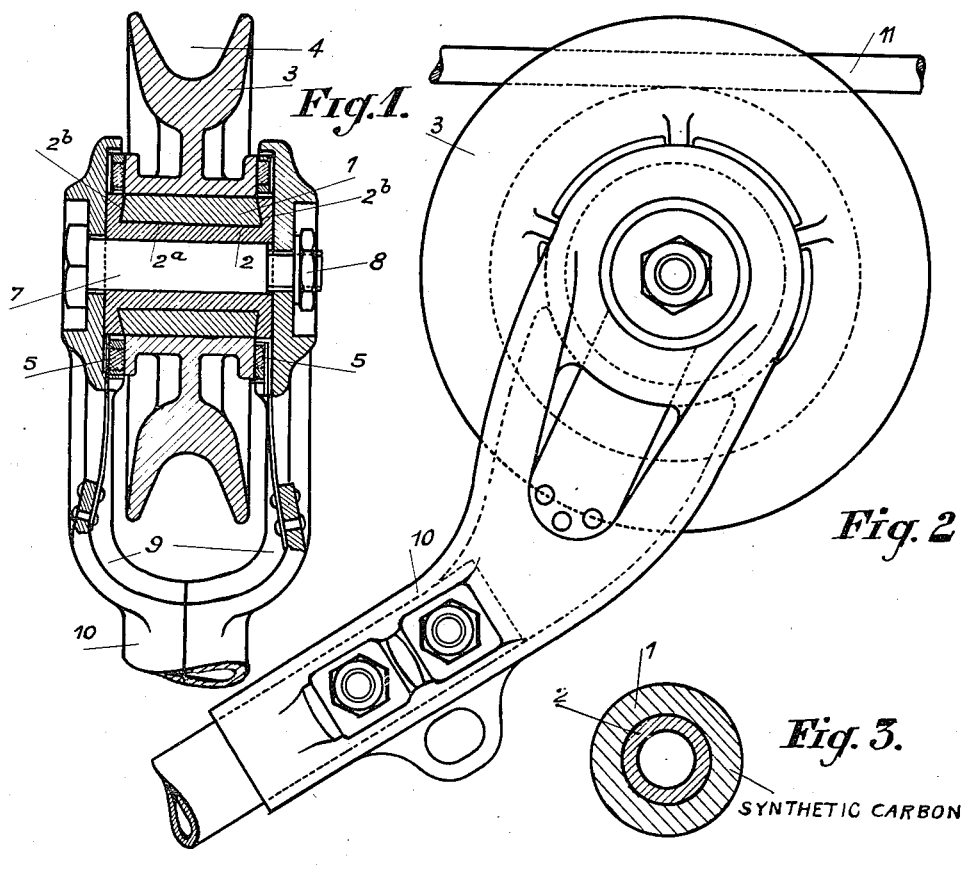
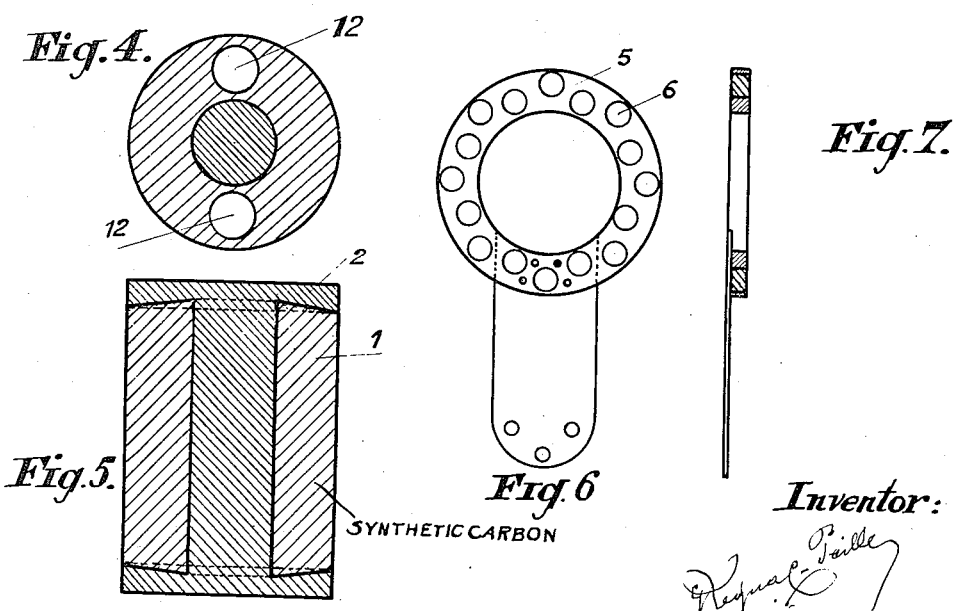
Inventor:
Regnac-Paille Patented July 7, 1936

2,046,482

UNITED STATES PATENT OFFICE 2,046,482

TROLLEY AND THE LIKE

Georges Regnac-Paille, Charleroi, Belgium

Application January 11, 1935, Serial No. 1,425
In Belgium November 28, 1934

3 Claims. (Cl. 191—63)

This invention relates to an improved axle for trolley rollers or contact member which serve for the transmission of electric current from a cable or the like to a member such as an electric motor, which is displaced relatively to the cable. The invention applies more particularly to axles of tramway-car trolley and the like.

Rollers for trolleys are generally carried by an axle maintained in a fixed position between the two branches of a trolley fork.

One object of the present invention is to improve the lubrication of the said axle, consequently to reduce its wear and to increase the efficiency not only of the axle, but also of the entire trolley head.

Another object of the invention is to make the trolley head more resistant and to prevent frequent breakages or a too rapid disintegration thereof.

Another object of the invention is to produce a trolley assemblage which, when used in tramway-cars or the like, shall reduce the interference produced in wireless apparatus situated in the neighbourhood.

According to one feature of the present invention, the cylindrical axle of the trolley roller is hollow and is reinforced on its inner face and on its side faces with a metal which is a good conductor of electricity.

Preferably, the side contact surfaces between the axle and its reinforcing metal have a dove-tailed form; this prevents the axle from falling off even when broken through some accidental cause.

Use may be made as a metal for reinforcing the axle, of an alloy containing a pure metal or metals free from carbon and silicon, for instance an electrolytic metal such as copper or/and zinc, or/and aluminium.

The cylindrical body of the axle which is subjected to friction, is preferably made of synthetic carbon.

The reinforced axle according to the present invention may find its application to all kinds of trolley heads, even when for instance the axle is held in a fixed position by several bolts which traverse it along its entire length.

The accompanying drawing shows by way of example two modes of carrying the present invention into effect, when applied to a tramway-car trolley.

Figure 1 is an elevational section of a trolley-head.

Figure 2 is a side view of the trolley head.

Figure 3 is a cross-section made along the axle.

Figs. 4 and 5 are cross-sections made in an axle of reinforced carbon according to the present invention, which is traversed by two bolts.

Figs. 6 and 7 are respectively a view and a section at right-angles of a support washer which will be mentioned hereinafter.

Referring to the drawing, 1 is the hollow trolley axle made of synthetic carbon, reinforced with a good-conducting metal 2 on its inner face 2a and on its side faces 2b. It should be noted that the contact surfaces 2b are dove-tailed. 3 is a roller having a groove 4. Washers 5, 5 are provided having small graphite cylinders 6 fitted into the washers and facilitating the lubrication.

7 is an assembling bolt with nut 8, passing across the hollow-axle 1 and assembling the reinforced axle with the two branches 9, 9 of the rod 10 of the trolley. 11 is the usual trolley wire carrying the electric current.

In the modification shown in Figs. 4 and 5, 1 is the carbon axle, 2 is the metal armature, 12 are the holes made into the axle for the passage of two bolts.

I claim:

1. A trolley head comprising a metal cylinder having flanged sides, a stationary hollow carbon axle surrounding the metal cylinder and having its ends contacting with the flanged sides of the metal cylinder, a roller contacting on its inner surface and along its entire width with the stationary hollow axle and adapted to rotate around the latter, as set forth.

2. A trolley head comprising a stationary metal cylinder made in one piece with flanged sides of dove-tailed shape, a stationary hollow carbon axle surrounding the stationary metal cylinder and having its ends contacting with the flanged sides of the stationary metal cylinder, a roller contacting on its inner surface and along its entire width with the hollow carbon axle and adapted to rotate around the latter, as set forth.

3. A trolley head comprising a stationary metal cylinder made in one piece with flanged sides of dove-tailed shape, a stationary hollow carbon axle surrounding the stationary metal cylinder and having its ends contacting with the flanged sides of the stationary metal cylinder, a roller contacting on its inner surface and along its entire width with the hollow carbon axle and adapted to rotate around the latter, a forked rod, and means for pressing the forked rod against the flanged sides of the metal cylinder, as set forth.

GEORGES REGNAC-PAILLE.